March 10, 1942.     H. C. SWIFT     2,275,700
FLUID PRESSURE BRAKING SYSTEM
Filed May 8, 1940
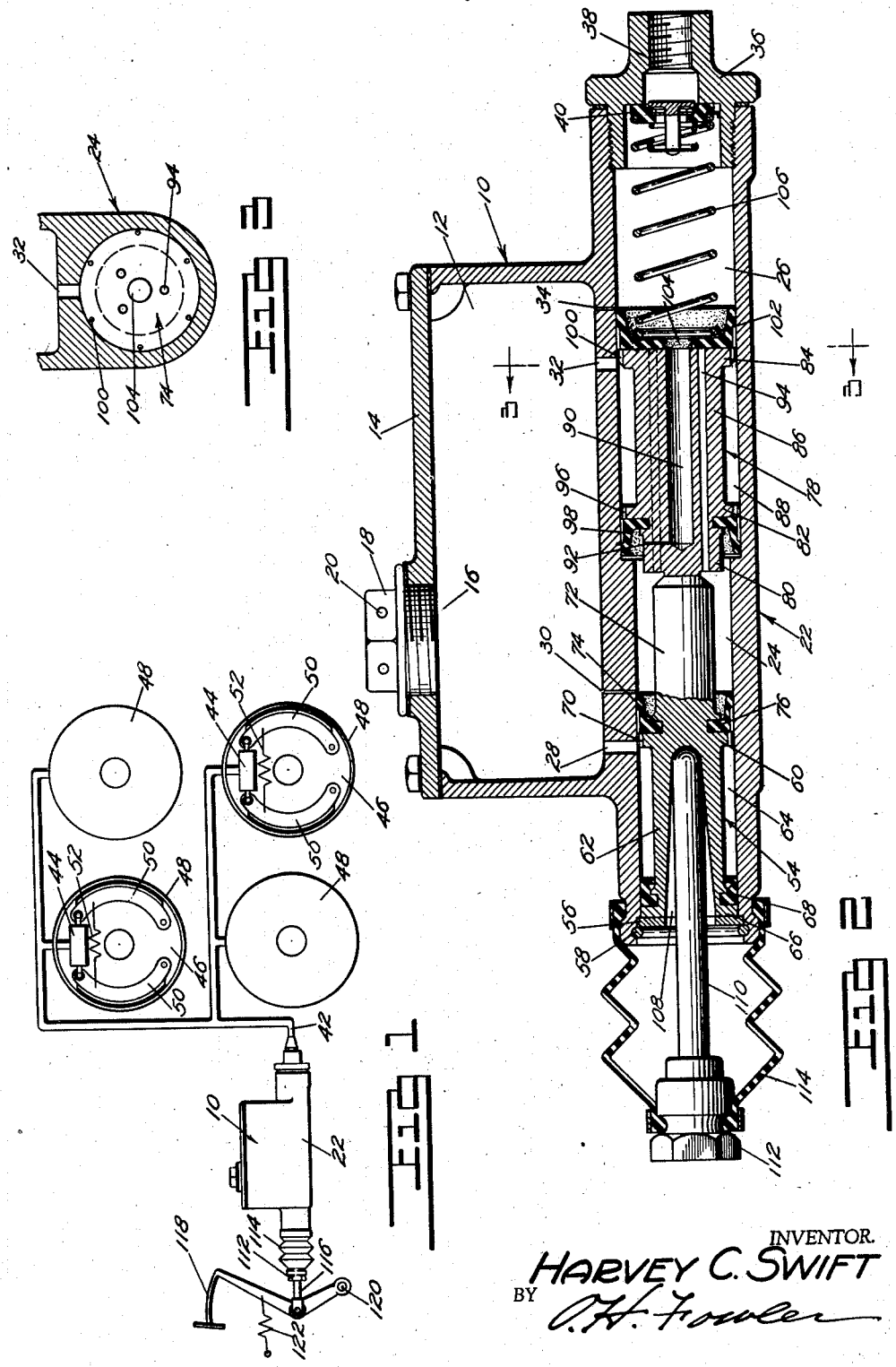
INVENTOR.
HARVEY C. SWIFT
BY Patented Mar. 10, 1942

2,275,700

UNITED STATES PATENT OFFICE 2,275,700

FLUID PRESSURE BRAKING SYSTEM

Harvey C. Swift, Detroit, Mich., assignor to Hydraulic Brake Company, Detroit, Mich., a corporation of California Application May 8, 1940, Serial No. 334,044

9 Claims. (Cl. 60—54.6)

This invention relates to fluid pressure braking systems and more particularly to fluid pressure producing devices.

Broadly, the invention comprehends a fluid pressure braking system including a fluid pressure producing device of the two-phase type operative to build up pressure from a rather low pressure to a relatively high pressure without proportionately increasing the applied operating force.

An object of the invention is to provide a fluid pressure device operative to gradually effect a transition from a low pressure to a relatively high pressure without spasmodic resistance.

Another object of the invention is to provide a fluid pressure producing device of the two-phase type having a low pressure producing means and a relatively high pressure producing means operative concomitantly and means for effecting a transition from low to high pressure over a wide range so as to smooth out the operation of the device.

Other objects and advantages of the invention will appear from the following description taken in connection with the drawing forming a part of this specification, and in which—

Fig. 1 is a schematic view of a fluid pressure braking system embodying the invention;

Fig. 2 is a vertical sectional view of the fluid pressure producing device; and

Fig. 3 is a sectional view substantially on line 3—3, Fig. 2.

Referring to the drawing for more specific details of the invention, 10 represents a fluid pressure producing device including a reservoir 12 having a removable cover 14, provided with a filling opening 16 normally closed as by a plug 18 having openings 20 therethrough for venting the reservoir to the atmosphere.

A cylinder 22 at the base of the reservoir has a small chamber 24 and a relatively large chamber 26 arranged concentrically to, forward of and in direct communication with the small chamber. The small chamber has arranged in its wall spaced ports 28 and 30 providing communications between the small chamber and the reservoir, and correspondingly the large chamber 26 has arranged in its wall spaced ports 32 and 34 providing communications between the large chamber and the reservoir.

The outer end of the large chamber 26 is closed as by a head 36 having a discharge port 38 controlled by a two-way valve 40, and a fluid pressure delivery pipe or conduit 42 connected to the discharge port 38 has branches connected respectively to fluid pressure actuated motors 44, preferably arranged in pairs, one pair for actuating brakes associated with the front wheels of the vehicle, and another pair for actuating brakes associated with the rear wheels of the vehicle.

As shown, the brakes are of conventional type, each including a fixed support or backing plate 46, a rotatable drum 48 associated with the backing plate, a pair of corresponding interchangeable friction elements or shoes 50 mounted on the backing plate for cooperation with the drum, a retractile spring 52 connecting the shoes, and a motor corresponding to the motors 44 mounted on the backing plate and connected to the shoes for actuating the shoes into engagement with the drum 46 against the resistance of the retractile spring.

A piston 54 reciprocable in the chamber 24 of the cylinder 22, is held against displacement by a washer 56 seated on an annular shoulder in the open end of the cylinder and secured in place by a retaining ring 58 seated in a groove in the wall of the cylinder. The piston 54 includes a head 60, a reduced body portion 62 providing in conjunction with the wall of the chamber 24 an annular chamber 64 communicating with the reservoir 10 by way of the port 28, and a skirt 66 supporting a sealing cup 68 for inhibiting seepage of fluid from the cylinder past the piston.

The head 60 of the piston has a plurality of spaced passages 70 therethrough providing communications between the annular chamber 64 and that portion of the chamber 24 forward of the piston. The head 60 also has a concentric extension 72 provided with a circumferential groove 74 adjacent the head 60 of the piston, and a sealing cup 76 sleeved over the extension and fitted in the groove 74 is seated on the head 60 for control of the passages 70.

A floating piston 78 in the chamber 26 has a rearward extension 80 normally seated on the extension 72 of the piston 54. The floating piston 78 includes spaced oppositely disposed heads 82 and 84 and a reduced body portion 86 providing in conjunction with the wall of the chamber 26 an annular chamber 88 communicating with the reservoir 10 by way of the port 32. The body 86 has a concentric bore 90 opening through the head 84 into the chamber 26 and communicating with the chamber 24 as by a restricted passage 92. The body 86 also has a plurality of spaced passages 94 therethrough providing communications between the chambers 24 and 26.

The head 82 of the piston 78 has a plurality of spaced passages 96 therethrough providing communications between the chamber 24 and the annular chamber 88. A sealing cup 98 sleeved over the extension 80 and fitted in a retaining groove therein seats on the head 82 for control of the passages 96.

The head 84 of the piston 78 has a plurality of passages 100 therethrough providing communications between the chamber 26 and the annular chamber 88. A sealing cup 102 seated on the head 84 has a concentric opening 104 registering with the bore 90 in the piston. This cup controls the passages 94 and 100, and a spring 106 interposed between the cup 102 and the two-way valve 40 serve to retain the cup and valve against displacement and also to return the pistons to their respective retracted positions.

The piston 54 has a socket 108 extended from its back well into the body of the piston, and a thrust pin 110 received by the socket has thereon a coupling 112 connected by a flexible boot 114 to the open end of the cylinder for the exclusion of dust and other foreign substances from the cylinders. A rod 116 has one of its ends connected to the coupling 112 and its other end pivotally connected to a foot pedal lever 118 rockable on a stub shaft 120 and connected as by a retractile spring 122 to a fixed support.

In a normal braking operation, upon depressing the foot pedal lever 118, force is transmitted therefrom through the rod 116 and thrust pin 110 to the piston 54 and also to the piston 78 through the extensions 72 and 80 resulting in advancing the pistons on the compression stroke. During the initial movement of the pistons, the sealing cup 76 on the head of the piston 54 covers the port 30 and correspondingly the sealing cup 102 on the head of the floating piston 78 covers the port 34. Thereafter, as the pistons advance on the compression stroke, a rather large volume of fluid is displaced from the chamber 26, past the two-way valve 40, through the discharge port 38, and fluid delivery pipe 42 and the respective branches thereof into the fluid pressure actuated motors 44, causing energization of the motors with the resultant actuation of the friction elements or shoes 50 into engagement with the drums 48 against the resistance of the retractile spring 52.

During this operation, the capacity of the chamber between the pistons 54 and 78 is gradually increased because of a differential in the diameters of the chambers 24 and 26, however, this is compensated for by fluid drawn from the reservoir 10 and by displacement of fluid from the chamber 26 through the bore 90 and restricted passage 92 into the chamber. The quantity of fluid received by the chamber between the pistons is proportional to the increase in the capacity of the chamber. However, the fluid displaced from the chamber 26 through the bore and restricted passage is of such value that it does not materially effect the rapid displacement of fluid from the chamber 26 into the fluid pressure actuated motors 44 during initial actuation of the brakes.

Upon further actuation of the friction elements to effectively retard rotation of the drums substantial resistance is offered to movement of the friction elements resulting in materially increasing the pressure in the fluid in the system. This causes rapid flow of fluid from the chamber 26 through the bore 90 and the restriction 92 into the chamber between the pistons and results in equalizing the pressure on the fluid fore and aft of the piston 78 and thereafter the piston 78 is ineffective for producing pressure. Immediately upon equalizing the pressures fore and aft of the piston 78, the piston 54 becomes effective for increasing pressure on the fluid as the net pressure creating area of pistons 54 and 78 is the area of the small piston 54 with the consequent increase in unit pressure in the fluid pipe lines. This transition from low to high pressure is accomplished over a wide range due to a slow and then a relatively rapid flow of fluid from the chamber 26 to the chamber between the pistons upon advance of the pistons until the pressures on the fluid fore and aft of the floating piston 78 is equalized.

Upon conclusion of a braking operation, the foot pedal lever 118 is released. This results in movement of the foot pedal lever to its retracted position under the influence of retractile spring 122. This movement of the foot pedal lever retracts the rod 116 and thrust pin 110 and this results in release of the pistons 54 and 78 and return thereof to their respective retracted positions under the influence of the retractile spring 106. As the pistons return to their retracted positions, a partial vacuum is created in the chamber 26 resulting in drawing fluid from the reservoir 10 through the port 32 into the annular chamber 88 thence through the passages 100 past the sealing cup 102 into the chamber 26. Concomitantly with this operation the capacity of the chamber 24 is gradually decreasing as the pistons move to their retracted positions and this results in displacement of fluid from the chambers 24 through the passages 94 in the floating piston past the sealing cup 102 into the chamber 24 and during this period fluid is returning to the chamber 26 from the fluid pressure actuated motors 44 and fluid pressure delivery pipe and branches thereof connecting the motors to the cylinder. This may result in the chambers 24 and 26 receiving a quantity of fluid in excess of their respective capacity and in that event fluid is returned from the chambers 24 and 26 to the reservoir 10 by way of the ports 30 and 34.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid pressure producing device comprising a cylinder having a small chamber and a large chamber, a discharge port in the large chamber, a piston reciprocable in the small chamber, and a floating piston in the large chamber having a fluid passage controlled by a sealing means seated on the piston and a restricted passage therethrough providing communications between the small chamber and the large chamber.

2. A fluid pressure producing device comprising a cylinder having a small chamber and a relatively large chamber forward of the small chamber, a discharge port for the large chamber, a piston reciprocable in the small chamber, and a floating piston in the large chamber having a plurality of fluid passages, means controlling the flow of fluid through the passages and a restricted passage therethrough, the floating piston providing communications between the chambers.

3. A fluid pressure producing device comprising a cylinder having a small chamber and a relatively large chamber concentric to and forward of the small chamber, a discharge port in the large chamber, a piston reciprocable in the small chamber and a floating piston in the large chamber normally seated on the piston, the floating piston having spaced oppositely disposed heads and a plurality of fluid passages therethrough, fluid flow being restricted through one passage and controlled through the other passages by a sealing means seated on the head of the floating piston.

4. A fluid pressure producing device comprising a reservoir, a cylinder at the base of the reservoir having a small chamber and a large chamber each communicating directly with the reservoir, a discharge port for the large chamber, a piston reciprocable in the small chamber, and a floating piston in the large chamber seated on the piston in the small chamber, the floating piston having a rectricted passage and a plurality of controlled fluid passages therethrough providing communications between the chambers and means on the floating piston controlling the passages.

5. A fluid pressure producing device comprising a reservoir, a cylinder at the base thereof having a small chamber and a relatively large chamber, a discharge port in the large chamber, a piston reciprocable in the small chamber having a chamber back of its head in communication with the reservoir, and means for by-passing fluid past the head in one direction, a floating piston in the large chamber adapted to be actuated by the piston in the small chamber, spaced heads on the floating piston and a chamber between the heads communicating with the reservoir, means for by-passing fluid past the heads in opposite directions, means for by-passing fluid through the floating piston in one direction and a restricted passage through the floating piston.

6. A fluid pressure producing device comprising a reservoir, a cylinder at the base thereof having a small chamber and a relatively large chamber, a discharge port in the large chamber, a piston reciprocable in the small chamber having a circumferential chamber communicating with the reservoir, means for controlling flow of fluid from the circumferential chamber to the small chamber, a floating piston in the large chamber having spaced heads and a circumferential chamber between the heads communicating with the reservoir, means for controlling flow of fluid from the chamber between the heads to the small chamber, means controlling flow of fluid from the chamber between the heads to the large chamber, means controlling passage of fluid through passages in the floating piston, and a restricted passage through the floating piston.

7. A fluid pressure producing device comprising a reservoir, a cylinder at the base thereof having a small chamber and a relatively large chamber each communicating with the reservoir, a controlled discharge port for the large chamber, a piston reciprocable in the small chamber, a floating piston in the large chamber, means for by-passing fluid past the piston in one direction, means for by-passing fluid past the floating piston in both directions, means for by-passing fluid through the floating piston in one direction, a restricted means for by-passing fluid through the floating piston, and means for actuating the pistons.

8. A fluid pressure producing device comprising a reservoir, a cylinder having a small chamber and a large chamber in direct communication with the reservoir, a discharge port in the large chamber, a piston reciprocable in each of the chambers for creating pressure therein, means for actuating the pistons, a chamber between the pistons communicating with the reservoir, a passage through the piston of the large chamber restricting the flow of fluid therethrough upon the actuation of the piston and subsequent creation of pressure forward of the piston, other passages through the piston of the large chamber for the passage of fluid from the chamber between the pistons to the large chamber, and means on the head of the floating piston controlling the flow of fluid through said passages.

9. A fluid pressure producing device comprising a reservoir, a cylinder at the base thereof having a small chamber and a large chamber, a discharge port in the large chamber, a piston reciprocable within the cylinder having a high pressure head in the small chamber and a pair of oppositely disposed heads in the large chamber, one head adjacent the small chamber and the other spaced therefrom in the large chamber, an annular chamber between the pair of heads in direct communication with the reservoir, a chamber between the high pressure head and the head adjacent the small chamber, passages through the heads of the piston controlled as by sealing means to allow a flow of fluid in only one direction, a passage through the piston communicating the large chamber with the small chamber and means restricting the passage of fluid therethrough, and a plurality of passages through the piston affording communication between the large and small chambers, said passages open at the small chamber end and controlled by the sealing means on the piston head in the large chamber at the large chamber end to thereby permit flow of fluid from the small chamber to the large chamber but to inhibit flow in the reverse direction.

HARVEY C. SWIFT.